United States Patent [19]

Liu

[11] Patent Number: 4,734,295

[45] Date of Patent: * Mar. 29, 1988

[54] GLARE CONTROL

[76] Inventor: P. Dong-Guang Liu, P.O. Box 201, Newton Highlands, Mass. 02161

[*] Notice: The portion of the term of this patent subsequent to Aug. 5, 2003 has been disclaimed.

[21] Appl. No.: 851,241

[22] Filed: Apr. 14, 1986

Related U.S. Application Data

[63] Continuation-in-part of Ser. No. 689,388, Jan. 7, 1985, Pat. No. 4,604,297, which is a continuation-in-part of Ser. No. 636,369, Jul. 31, 1984, Pat. No. 4,582,761.

[51] Int. Cl.$^4$ .................. C03C 17/32; C09D 3/76; B05D 5/06; B05D 7/26
[52] U.S. Cl. ............................ 427/64; 427/108; 427/110; 427/160; 427/161; 427/164; 427/165; 427/168; 427/195; 427/333; 427/336; 427/340
[58] Field of Search ............. 427/64, 108, 110, 160, 427/164, 165, 168, 161, 336, 340, 333, 195

[56] References Cited

U.S. PATENT DOCUMENTS

| | | | |
|---|---|---|---|
| 2,734,142 | 2/1956 | Barnes | 313/92 |
| 3,298,990 | 1/1967 | Cousens et al. | 427/195 |
| 3,374,130 | 3/1968 | Junge et al. | 156/24 |
| 3,485,662 | 12/1969 | Metevia et al. | |
| 3,576,356 | 4/1971 | Hyman et al. | 350/156 |
| 3,679,277 | 7/1972 | King | 96/50 |
| 3,679,451 | 7/1972 | Marks et al. | 117/33.3 |
| 3,736,050 | 5/1973 | Bolum | 350/316 |
| 3,944,100 | 3/1976 | Brockway et al. | 215/1 C |
| 4,168,332 | 9/1979 | Leinen et al. | 427/160 |
| 4,246,613 | 1/1981 | Choder et al. | 358/245 |
| 4,251,572 | 2/1981 | Herliczek et al. | 427/142 |
| 4,332,861 | 6/1982 | Franz et al. | 428/250 |

OTHER PUBLICATIONS

*Condensed Chemical Dictionary*, 6th Ed., Rheinhold Pub., N.Y., 1961, p. 1202.

*Primary Examiner*—Janyce A. Bell

[57] ABSTRACT

A method and kit for glare control and improvement of image transmission through a reflective-transmissive surface comprising surface irregularities to control glare. A dispersion of particles is applied to the surface and allowed to dry. Then an inert fluid coating is applied to the surface to enhance clarity. A liquid dispersion comprising a flattening agent is applied to the surface and allowed to dry so that the particles and flattening agent form a transparent glare-reducing coating. An inert fluid coating is applied to sufficient thickness to remove some, but not all, of the surface irregularities created by the glare reducing coating. A method of formulating the liquid dispersion is also disclosed.

18 Claims, 3 Drawing Figures

GLARE CONTROL

BACKGROUND OF THE INVENTION

This is a continuation-in-part of my co-pending U.S. patent application Ser. No. 689,388, filed Jan. 7, 1985, issued as U.S. Pat. No. 4,604,297, which in turn was a continuation-in-part of my co-pending U.S. patent application Ser. No. 636,369, filed July 31, 1984, issued as U.S. Pat. No. 4,582,761, both of which are hereby incorporated by reference.

This invention relates to compositions and methods for treating a reflective-transmissive surface to control reflected glare and to surfaces that have been so treated.

Items of various sorts are viewed through an abutting transmissive surface. For example, glass or plastic surfaces are used to protect the electronic viewing screens. By the term "electronic viewing screens," I mean to include viewing screens of all types including, without limitation, screens for television sets, video display terminals, television monitors, test equipment screens, word processor screens, mini-computer screens, main frame computer monitors, other cathode-ray tube screens, liquid crystal displays (LCD's), light emitting diodes (LED's) watches, oscilloscopes, plasma screens, and electroluminescent displays (EL's). By television sets and television monitors, I mean to include black and white television, color television, red/green/blue monitors, green monitors, and amber monitors; I also mean to include digital as well as raster scanning television sets and vector sets. Artwork or photographs may have intrinsically reflective surfaces, or they may be protected by glass or plastic.

Locations for viewing such surfaces may generate serious glare. For example, the surfaces may reflect room lights or light entering through room windows. In the workplace, various equipment may reflect fluorescent lights or incandescent lights as well as window light. Such glare is annoying. More important, it prevents transmission of information and images, it causes squinting and headaches, and it is generally fatiguing and efficiency reducing. There have been considerable complaints about these problems from those who use such screens regularly—for example, office workers.

The problem to be addressed is allowing light to pass from the viewing surface to the viewer, while at the same time significantly reducing or eliminating reflections from that surface. Specifically, where the viewing surface is a glass or plastic surface, light must be transmitted through the surface from an object immediately therebehind, and light impinging on the surface from the viewer's side must be effectively dispersed to avoid objectionable reflection.

In some cases, glare reduction may be achieved at the expense of the quality of the transmitted image. It is highly desirable to be able to control the amount of glare reduction so that glare reduction and transmitted image quality are maximized for a given application.

Various efforts to reduce glare have been disclosed.

Junge et al. U.S. Pat. No. 3,374,130 discloses an etching process for producing low specular reflecting or low image reflecting surfaces on glass.

Leinen U.S. Pat. No. 4,168,332 discloses a non-glare abrasion resistant coating for glass or plastic that protects and overlies artwork. The coating is made by spraying a polymerizable solution comprising an epoxy prepolymer of an epoxy-terminated silane and an oxirane copolymer onto the glass.

King U.S. Pat. No. 3,679,277 discloses a non-glare reflective photographic print having a matte-surfaced polyester film—for example, poly(ethylene)terephthalate, permanently bonded to the photographic emulsion.

Marks et al. U.S. Pat. No. 3,679,451 discloses coatings for decreasing reflected images from the surface of a transparent sheet used for displays; the coatings are mixtures of organic and inorganic polymers—for example, a mixture of polyvinyl butyral, polyvinyl alcohol acetate copolymer and polysilic acid.

Bohum, U.S. Pat. No. 3,736,050, discloses a filter with an anti-reflective coating to be used with a cathode-ray tube.

Hyman et al., U.S. Pat. No. 3,576,356, disclose a multi-layer anti-glare coating for a cathode-ray tube implosion shield. The coating is a semiconductive material sandwiched by dielectric layers so that a voltage pen can make electrical contact through the dielectric layers to the semiconductive layer.

Barnes, U.S. Pat. No. 2,734,142, discloses a reflection reduction coating comprising discrete microgranular transparent solid particles that are deposited by a spinning process on a lens adapted for a cathode-ray tube. A color neutralizing layer is provided at the surface of the lens.

Choder U.S. Pat. No. 4,246,613 discloses a non-glare screen for a video display terminal.

Various references disclose methods of repairing surfaces.

Herliczek et al. U.S. Pat. No. 4,251,572 discloses restoring or repairing surface scratches etc. with a filler and coating with a protective layer of acrylic resin to mechanically protect and increase the durability of the repair.

Metevia et al. U.S. Pat. No. 3,485,662 discloses restoring transparency to molded silicone elastomer compositions which have been rendered translucent by surface imperfections. The elastomer is coated with a coating composition consisting of polysiloxane, a copolymer of siloxane units, and a compatible compound containing silicon-bonded hydrogen atoms.

Franz et al. U.S. Pat. No. 4,332,861 discloses repairing acrylic transparencies such as aircraft windows by coating roughened surfaces with a high gloss polymer, preferably a fast curing acrylic, polyurethane, or epoxy.

SUMMARY OF THE INVENTION

I. Anti-glare

One aspect of the invention features a method of controlling glare by coating a reflective, transmissive surface with a liquid dispersion comprising organic polymeric particles and a flattening agent, and then allowing the coating to dry, so that the particles and flattening agent form a transparent, glare-reducing coating at the surface.

In preferred embodiments, the liquid dispersion includes an organic polymer containing liquid selected from:

(1) dispersions containing latices;
(2) varnishes;
(3) polyurethane dispersions;
(4) lacquers;
(5) co-reactable systems; or
(6) condensing systems.

The flattening agent preferably is selected from cellite, magnesium carbonate, alumina hydrate, wax, aluminum stearate, zinc tungate, silica and zinc stearate.

The invention also features a reflective-transmissive surface that has been coated with the above described dispersion.

In preferred embodiments of either of the above glare-reducing methods or surfaces, the surface is glass or plastic protecting an electronic screen as defined above, or the surface is a window used where it is desirable to allow transmission of some diffused light without allowing unimpeded transmission of light and heat—for example, where it is desirable to have privacy or to reduce heating of rooms by sunlight.

The invention also features a method of making an aqueous dispersion of polyvinyl acetate and acrylic resin, for use in the above method, by mixing the two resins to form a viscous composition that is first dispersed in alcohol and then is diluted in water. In preferred embodiments of that method, the mixture is an acrylic matte varnish and PVA white adhesive, in a ratio adhesive:varnish between 8:1 and 1:8 (volume to volume).

The invention provides a durable, glare-reducing coating that allows transmission of light from the immediate vicinity of the coated surface. Specifically, where an object is to be viewed through the surface such as artwork or an electronic screen, light is transmitted from the object so as to provide a clear image with little or no distortion.

At any given instant, electronic screens such as raster scan televisions, or indeed any other screen composed of pixels, produce light at discrete screen locations rather than continuously over the area of the screen. The invention generally can improve the perceived image quality from such screens by creating enough dispersion to "fill in" the unlit regions between lines or pixels with information from the immediately adjacent area. Thus, the invention is particularly advantageous for electronic screens generally and for televisions and computer displays in particular, such as computerized word processing terminals.

Another advantage of the invention is the static dispersion capability of the coating. Static may build up on electronic screens eventually causing deterioration of image and color quality and posing a hazard to sensitive electronic components. The screen coating serves to dissipate the static, thus avoiding excessive build up of charge. While not being bound to any theory, the resin particles in the coating apparently are randomly oriented, thus aiding dispersion of charges that may build up—for example, at phosphor locations on the screen.

II. Transmission Enhancement

Also in preferred embodiments, after the anti-glare coating has been applied, an inert fluid coating is applied to have sufficient thickness to remove some, but not all, of the anti-glare effect of the glare-control surface irregularities created by the coating. By gradually reducing the thickness of the coating, it is possible to achieve an optimal balance of image quality and glare reduction, while at the same time retaining the ability to alter that balance to accommodate different glare environments and different types of imaging systems.

Finally the invention features a kit for treating a transparent specular surface to provide controlled anti-glare and controlled transmission through the surface. The kit comprises: an anti-glare coating comprising a liquid dispersion of particles and an inert transmission control fluid.

In preferred embodiments of the use of the inert transmission enhancing coating, the viewing surface is an electronic screen. The inert fluid coating is applied and then portions are removed to achieve controlled transmission. Also in preferred embodiments, the surface irregularities comprise surface particulates comprising a range of sizes so that the anti-glare effect of smaller particulates can be obscured without obscuring the anti-glare effect of larger particulates; and the incremental removal of the fluid coating will provide incremental control over the anti-glare effect. The fluid coating is comprised of a substance that wets the surface particulates. Also in preferred embodiments, the non-specular surface particulates are provided by applying a liquid dispersion of the particulates to a relatively specular surface, and allowing the liquid to dry before the inert transmission enhancing fluid coating is applied. For example, a dispersion (preferably aqueous or partially aqueous) of either polyvinyl acetate or acrylic or both is applied and allowed to dry. Most preferably the dispersion comprises an acrylic resin comprising a matte varnish mixed with polyvinyl acetate. Alternatively, the dispersion for generating the surface irregularities comprises particulates selected from matte surfaced polyester films, polyvinyl butyral, polyvinyl alcohol acetate copolymer, or polysilic acid.

Other features and advantages of the invention will be apparent from the following description of preferred embodiments and from the claims.

DESCRIPTION OF THE PREFERRED EMBODIMENT

I first briefly describe the drawings illustrating a particularly preferred embodiment of the invention.

I. Drawings

Figure 1:
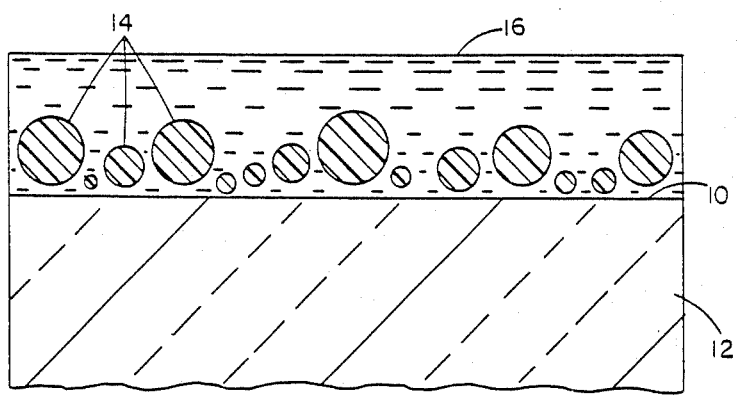
Figure 2:
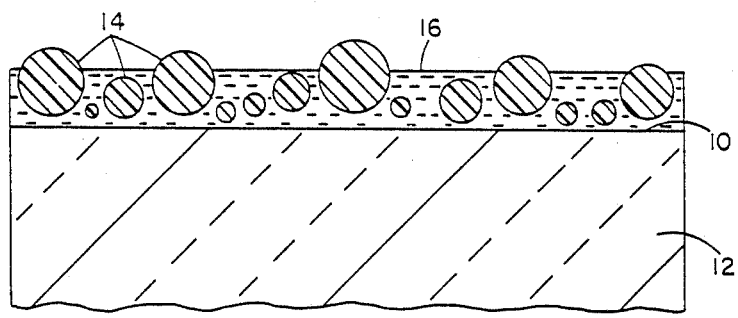
Figure 3:
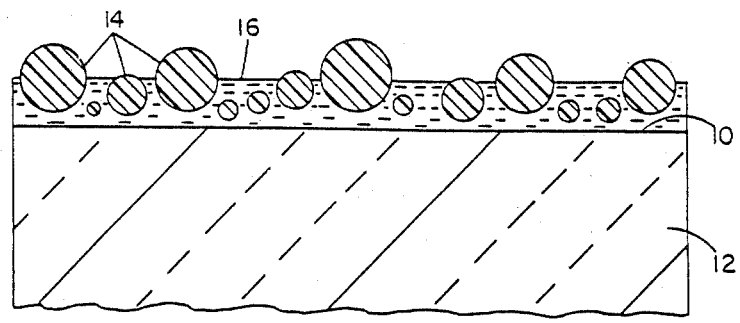

FIGS. 1, 2, and 3 are highly diagrammatic representations of the anti-reflective surface demonstrating control of surface irregularities.

II. Anti-glare Coating

A. Composition

Any of a great variety of polymer-containing liquid dispersions can be used in the coating formulation. Latices which can be used include:
 (a) acrylate;
 (b) butadiene copolymers such as butadiene acrylonitrile or butadiene styrene;
 (c) polystyrene;
 (d) vinyl chloride;
 (e) vinylidene chloride-acrylonitrile; and
 (f) vinyl pyridine.

Preferred varnishes are acid and alkali resistant and waterproof. Various polyurethanes that are preferred include co-reactable polyurethanes, moisture-cured polyurethanes, and urethanes produced from aliphatic or aromatic isocyanates. Epoxies that can be used include co-reactable epoxy-amines, epoxy-polyamides, and coal tar-epoxy. Condensing substances such as epoxy phenolics, epoxy powder and baked phenolics also can be used.

Finally, various other liquid dispersions used include:
 (a) alkyd;
 (b) silicone;
 (c) acrylic;
 (d) polyester;

(e) phenoplasts;
(f) polytetrafluoroethylene;
(g) nylon;
(h) cellulose esters and ethers;
(i) amino resins; and
(j) copolymers of ethylene or propylene.

Suitable coatings are available from numerous sources known to those in the field, including sources listed in the *Modern Plastics Encyclopedia* 1983-1984, McGraw Hill, N.Y., N.Y. or in Kirk-Othmer *Encyclopedia of Chemical Technology*, published 1978, John Wiley & Sons, New York.

In one particularly preferred embodiment, described in U.S. patent application Ser. No. 636,369, dispersion of polyvinyl acetate (PVA) provides glare reduction. An aqueous dispersion of acrylic resin provides other useful properties and interacts with the PVA to improve the characteristics of the anti-glare coating as described below. However, either component, by itself, serves as a suitable anti-glare coating, particularly when combined with the transmission enhancing coating described above.

By polyvinyl acetate resin I mean resins such as those commonly used in latex paints, adhesives, surface coatings, and textile finishes, as typified by the following functional unit:

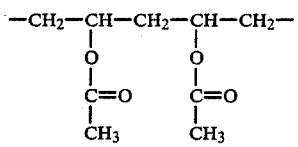

By acrylic resin I mean resins such as those typified by polymers and copolymers of methyl methacrylate, acrylic acid, and acrolein.

The preferred PVA dispersions are water soluble white adhesive. They dry to a generally clear coating with a glare reducing surface that disperses reflected light. These dispersions are relatively easy to work with, being non-toxic and water soluble. A suitable white adhesive dispersion is sold by Borden Chemical Co., Inc. of Columbus, Ohio.

The preferred acrylic resin is an aqueous acrylic emulsion. That emulsion is preferably a matte varnish which includes a flattening agent to preserve the antireflective quality of the coating. Cellite or other diatomaceous flattening agents are suitable, as are magnesium carbonate, alumina hydrate, wax, aluminum stearate, zinc tungate, silica, or zinc stearate. Roplex AC 234 (Rohm and Haas) is a suitable acrylic resin base to make acrylic paints, varnishes, etc. Utrecht Co., New York, N.Y., makes a suitable matte varnish.

In presently preferred formulations, an anti-foam additive is included to avoid irregularities in the coating caused by bubbles or foam. A surfactant or detergent may also be included to lower the surface tension of the dispersal, aid spreading, and improve the uniformity of the coating. Presently preferred surfactants are nonionic alkylaryl polyether alcohol types such as the Triton series sold by Rohm and Haas Company, Philadelphia, Pa. Finally, a thickening agent such as sodium polyacrylate may be used to enhance the stability of the formulation. The Acrysol series sold by Rohm and Haas are such suitable agents.

B. Formulation

In general, the anti-glare coating is formulated from commercially available dispersions, which may include the flattening agent. The following example illustrates the formulation of the above-described PVA-acrylic dispersion.

A preferred method for formulating the above-described composition to give improved coating characteristics is described below.

The polyvinyl acetate dispersion is blended with the acrylic dispersion in a volume/volume ratio of between 8:1 and 1:8, and most preferably about 1:2 or 1:3. The resulting mixture has a stiff, gum-like consistency far more viscous than the starting materials. Without being bound to any particular theory, it appears that the PVA and acrylic polymer interact to improve the distortion-free light-transmission properties.

The thick mixture is thinned with isopropyl alcohol while stirring, and then water is added. The alcohol should be added first to avoid agglomeration of the resins.

The resulting mixture is a smoother, more stable dispersion with benefits not provided by the separate components. Specifically, PVA without acrylic resin provides a non-glare surface but is not entirely distortion-free due to its consistency. While acrylic resin by itself may not provide sufficient glare protection, flattening agents may be added, to enhance glare protection. In that case, it is desirable to use the transmission enhancement coating described below.

C. Use

The dispersion may be coated on the surface with any suitable applicating device such as a brush, spray or sponge. If carefully applied and allowed to dry, it forms a durable, non-glare coating that does not interrupt transmission of light from the object being viewed.

Specifically, the coating is applied to glasses and plastics used to protect electronic viewing screens as defined above.

III. Transmission Enhancement

Without being bound to any particular theory, it appears that the above-described anti-glare coating functions at least in part as a result of irregular particles at the surface of the coating. The surface particles prevent reflection from what would otherwise be a specular glass-type screen surface, and the transmission of light will be generally acceptable, particularly for viewing relatively large objects such as the figure of a person performing in a television broadcast.

Nevertheless, additional fine detail may be desired, depending on the user and on the application. For example, when a CRT is used as a computer display monitor for alphameric characters or where additional clarity of facial features is sought for close-up viewing of a television broadcast, it may be desirable to enhance the detail and contrast above that provided through the anti-glare coating. Such control of the degree of the anti-glare effect and enhancement of contrast is provided by a second coating applied over the first. The second coating serves to reduce the irregularities in the first surface coating by smoothing it out. Significantly, the second coating is not so thick as to create a perfectly specular surface (i.e., by entirely obliterating the effect of surface particles); rather it only partially obliterates the anti-glare effect of the surface irregularities, e.g. by covering the smaller particulates, but not the larger particulates.

The degree of anti-glare and the amount of contrast and resolution can be controlled by controlling the thickness of the second layer. The thicker the fluid layer, the more of the surface irregularities that are obliterated—i.e., covered—and the fewer the irregularities that are large enough to remain uncovered, and therefore the more reflective the surface is. Control over the thickness of the fluid layer is provided by using a liquid coating substance that can be wiped off incrementally.

FIG. 1 depicts in a highly diagrammatic way a specular surface 10 of a transparent screen 12. Particulates 14 of varying sizes have been deposited on surface 10 to reduce the reflection of light incident on that surface. Finally, a fluid layer 16 has been applied to the surface to improve light transmission through screen 12. In FIG. 1, the fluid layer is so thick that it completely obscures the surface particulates 14 to provide specular surface. FIGS. 2 and 3 depict the same screen after increasing amounts of the fluid layer have been removed to increase the anti-glare properties of the screen of FIG. 1. In FIG. 2, the largest particulates extend through fluid layer 16, making the surface more irregular than in FIG. 1 and thus reducing reflection. In FIG. 3 more of the particulates extend through layer 16, and the surface irregularity is increased over that of FIG. 2.

Surprisingly, the thickness range control thus provided is such that it is possible to retain very substantial glare reduction which is adequate for most environments and applications, while at the same time improving the transmission quality to a degree that is particularly noticeable for images of smaller objects, e.g. characters on a computer display monitor.

The fluid coating should be a clear to semi-clear liquid or cream that does not itself introduce significant irregularity to the anti-glare surface. The fluid coating preferably remains in a fluid or liquid phase at the anti-glare surface. The coating should not be degraded by heat experienced at the screen surface, and it should be inert to atmospheric components as well as to the components of the anti-glare coating and other electronic screen components.

Specific coating materials that can be used are:

| | |
|---|---|
| hydrocarbon waxes and oils, | hydraulic oil, |
| clear acrylic coatings, | sperm oil, |
| polyethylene glycol, | automotive engine oil, |
| dibutylpthalates, | technical oils, |
| polyvinyl alcohol, | mineral oil, and |
| tributoxyethyl phosphates, | vegetable oils (e.g. |
| dioctylpthalates, | almond, cotton seed, |
| fatty acids, | olive, or rosewood |
| polyurethane, | oil.) |
| polyethylene, | |
| esters, | |
| squalane, | |
| polysynlane, | |

The second coating may be applied manually using an absorbant pad, soft cloth, or low-lint paper as an applicator. A second pad or cloth may be used for controlled removal of part of the second coating until the desired properties are achieved.

The degree of anti-glare achieved can be determined visually or it can be measured by measuring the solid angle defined by a reflected laser beam. Using the solid angle reflected from glass as an index of 1, the anti-glare coating described above can be applied to increase the diffusion of the reflection by a factor of 10,000–40,000. A fluid coating can then be applied to enhance the clarity of transmission without unacceptably reducing the anti-glare effect.

OTHER EMBODIMENTS

Other embodiments are within the following claims. For example, other dispersion vehicles can be used such as an alcohol/water vehicle for the acrylic resin. The coating may be applied by other methods such as by suitable spray apparatus, in which case a vehicle system with a more volatile organic component may be used. The method may be used for other surfaces such as for windows where privacy is desired without blocking out all light, or where it is desirable to filter out heat while still allowing some light to be transmitted.

The inert fluid coating may be used to control the transmission quality through and glare from non-specular surfaces other than those coated with the non-glare coating. For example, acid etched surfaces or frosted surfaces may be treated with the inert fluid coating to provide controlled transmission improvement and non-glare. The inert fluid coating may be a substance that subsequently hardens, e.g. polyvinyl alcohol or acrylic.

I claim:

1. A method of controlling glare from a reflective-transmissive surface comprising
   providing a liquid dispersion comprising organic polymeric particles and a flattening agent,
   coating the surface with said liquid dispersion,
   allowing the coating to dry leaving the organic particles and flattening agent in a transparent coating at the surface, thereby creating surface irregularities that reduce reflected glare at said surface, while allowing transmission of light through the surface to permit viewing of objects behind the surface, and
   then applying an inert fluid coating sufficiently thick to remove at least some, but not all, of the anti-glare effect of the surface irregularities.

2. The method of claim 1 wherein the liquid dispersion comprises acrylic resin particles.

3. The method of claim 1 wherein the liquid dispersion comprises a latice polymer.

4. The method of claim 1 wherein the liquid dispersion comprises a polyurethane dispersion.

5. The method of claim 1 wherein the liquid dispersion comprises a varnish.

6. The method of claim 1 wherein the liquid dispersion comprises a lacquer.

7. The method of claim 1 wherein the liquid dispersion comprises a co-reaction polymer.

8. The method of claim 1 wherein the liquid dispersion comprises a condensation polymer.

9. The method of claim 1 wherein said surface is a viewing surface of an electronic screen.

10. The method of claim 1 wherein said inert fluid coating is applied and then portions thereof are removed to achieve controlled transmission.

11. The method of claim 10 wherein said inert fluid coating is applied to a thickness that covers all particulates on said surface, and said fluid coating is then removed to a thickness that exposes some, but not all, of said particulates.

12. The method of claim 1 wherein the liquid dispersion comprises a latex polymer selected from acrylate, butadiene co-polymers, polystyrene, vinyl chloride, vinylidene chloride-acrylonitrile co-polymer, and vinyl pyridine.

13. The method of claim 12 wherein the butadiene co-polymer is selected from butadiene acrylonitrile and butadiene styrene.

14. The method of claim 1 wherein the dispersion comprises a polyurethane.

15. The method of claim 14 wherein the polyurethane comprises a co-reactable polyurethane, a moisture-cured polyurethane, or a urethane produced from an alphatic or aromatic isocyanate.

16. The method of claim 1 wherein said dispersion comprises an epoxy.

17. The method of claim 16 wherein said epoxy is a co-reactable epoxy-amine, an epoxy-polyamide, a coal tar epoxy, an epoxy phenolic, or an epoxy powder.

18. The method of claim 1 wherein said liquid dispersion comprises a polymer selected from alkyl, silicone, acrylic, polyester, phenoplasts, polytetrafluoroethylene, nylon, cellulose ester, a cellulose ether, amino resins, or a co-polymer of ethylene or propylene polymers.

* * * * *